Dec. 16, 1952  C. G. GORDON  2,621,873
AIRCRAFT CONTROL
Filed March 31, 1947  7 Sheets-Sheet 1

INVENTOR.
CARROLL G. GORDON
BY William R. Lane
ATTORNEY

Dec. 16, 1952  C. G. GORDON  2,621,873
AIRCRAFT CONTROL
Filed March 31, 1947  7 Sheets-Sheet 2

INVENTOR.
CARROLL G. GORDON
BY William L. Lane
ATTORNEY

Dec. 16, 1952  C. G. GORDON  2,621,873
AIRCRAFT CONTROL

Filed March 31, 1947  7 Sheets-Sheet 3

INVENTOR.
CARROLL G. GORDON
BY William R. Lane
ATTORNEY

Dec. 16, 1952
C. G. GORDON
2,621,873
AIRCRAFT CONTROL
Filed March 31, 1947
7 Sheets-Sheet 4
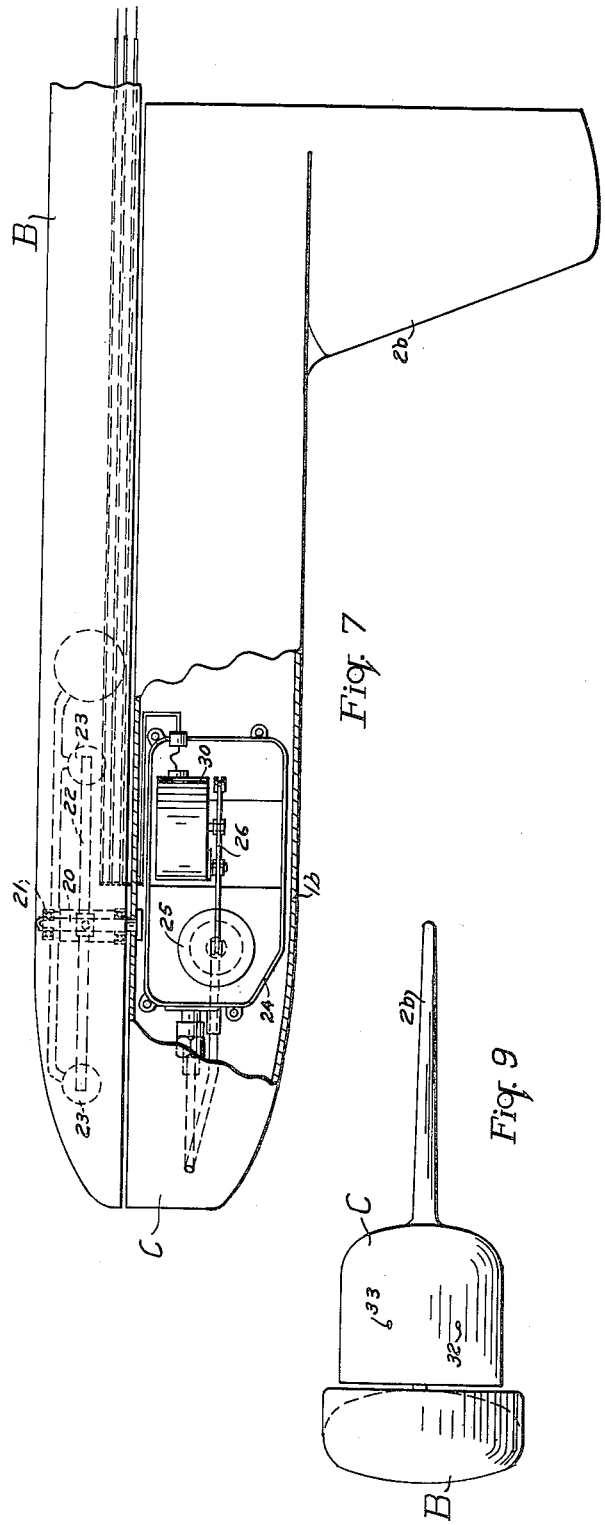
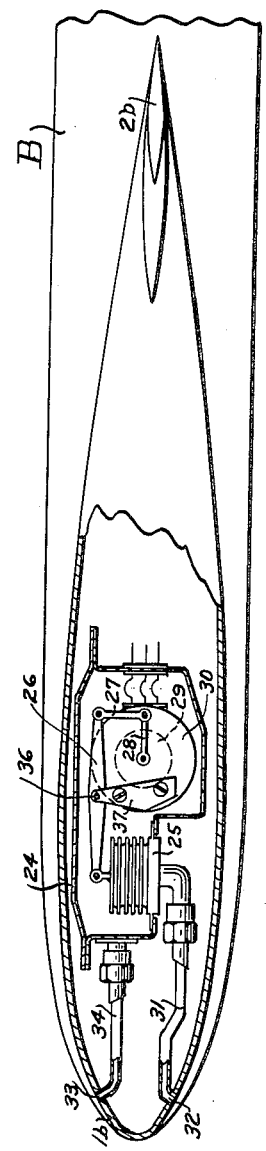
INVENTOR.
CARROLL G. GORDON
BY William R. Lane
ATTORNEY Dec. 16, 1952           C. G. GORDON           2,621,873
AIRCRAFT CONTROL
Filed March 31, 1947           7 Sheets-Sheet 5
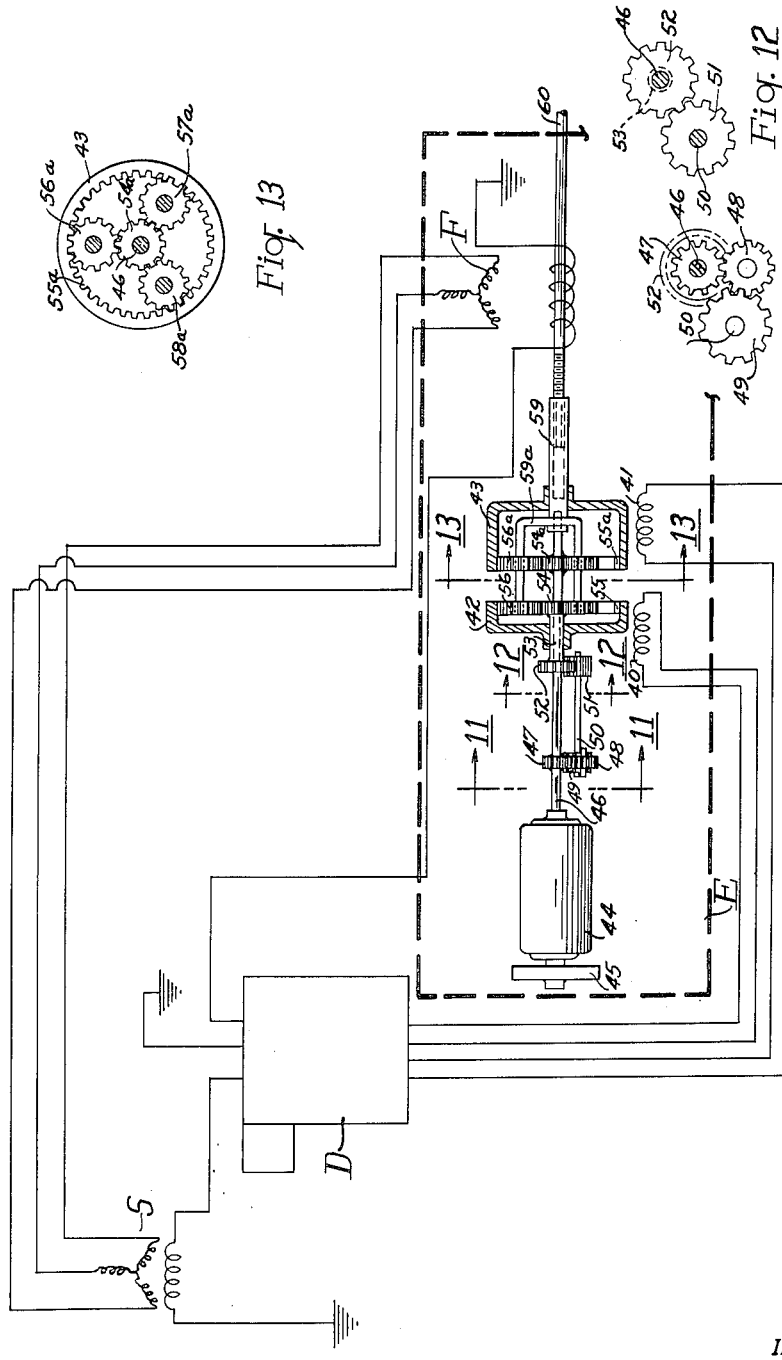
INVENTOR.
CARROLL G. GORDON
BY *William R. Lane*
ATTORNEY

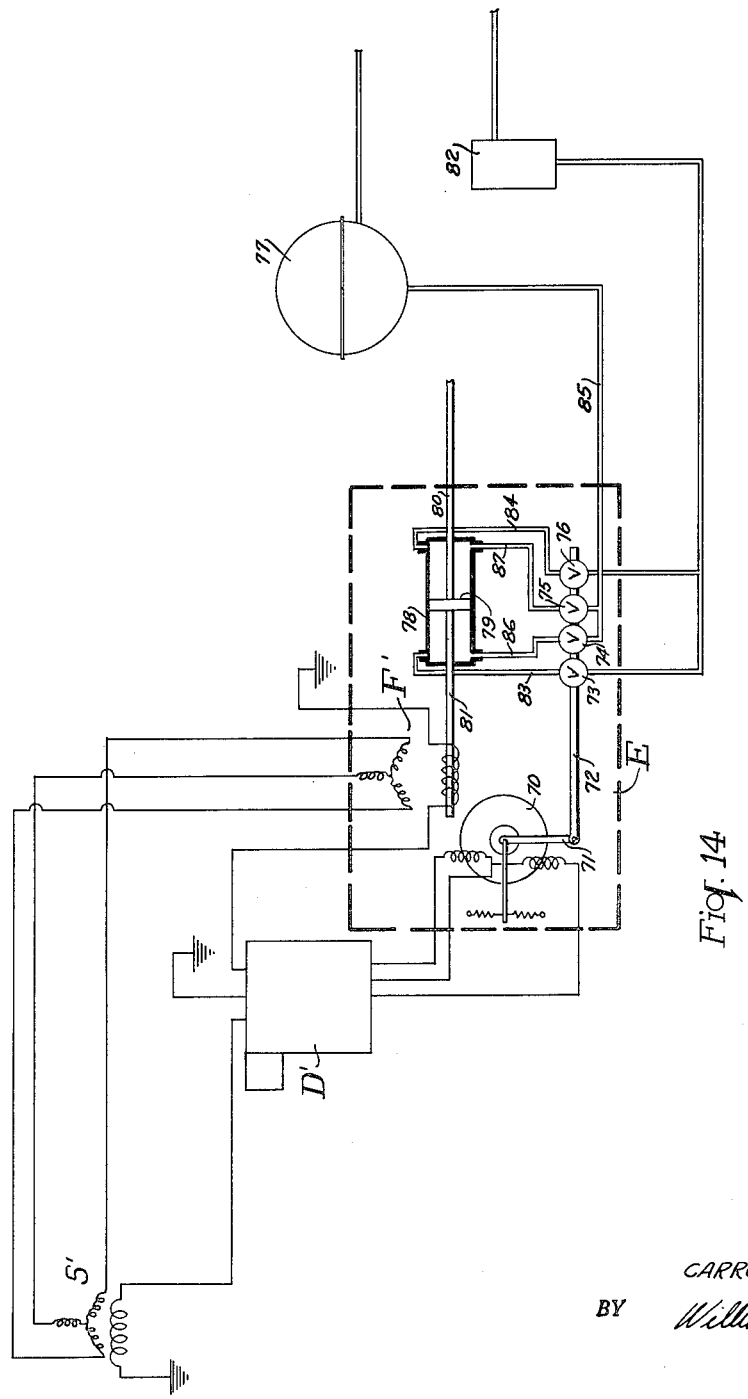

Dec. 16, 1952     C. G. GORDON     2,621,873
AIRCRAFT CONTROL

Filed March 31, 1947     7 Sheets-Sheet 7

INVENTOR.
CARROLL G. GORDON

BY *William R. Lane*
ATTORNEY

Patented Dec. 16, 1952

2,621,873

UNITED STATES PATENT OFFICE 2,621,873

AIRCRAFT CONTROL

Carroll G. Gordon, Pasadena, Calif., assignor to North American Aviation, Inc.

Application March 31, 1947, Serial No. 738,467

10 Claims. (Cl. 244—82)

This invention relates to a gust detecting device and associated operating mechanism for use with a gust alleviating system on aircraft. Reference is made in this connection to application Serial No. 664,044 filed April 22, 1946 covering broadly a system for alleviating the effect of gusts on an airplane. Gusts, as used herein, comprise those extrinsic forces resulting from turbulent air which, if encountered by an airplane and not alleviated or compensated for, would tend to project it upwardly or downwardly in the direction of its normal axis.

Generally speaking, the desired result is accomplished by measuring the effect of a gust and adjusting the wing-lift coefficient or characteristics of the airplane so as to effectively nullify any such effect.

This invention comprises a gust detector adapted to be suitably positioned on an airplane, and preferably in a leading position with respect thereto. The gust detector is adapted to be operatively connected with flap operating mechanism or other mechanism used to change the wing-lift coefficient or characteristics of the airplane to obtain the result desired.

It is therefore an object of this invention to provide a mechanism which will result in effectively nullifying gust effects and at the same time automatically correct for any change in angle of attack of the airplane to maintain the gust detecting mechanism in neutral position.

It is a further object of this invention to maintain a plane of reference, independent of the attitude of the airplane, from which changes are made in the wing-lift coefficient or characteristics of the airplane to alleviate or nullify the effect of gusts.

It is a further object of this invention to provide a gust detector or differential "sniffer" adapted to transmit impulses or signals corresponding to gust characteristics to mechanism adapted to change the wing-lift coefficient or characteristics of the airplane.

It is a further object of this invention to provide a pair of vanes dynamically and statically balanced and operatively interconnected, one vane of which is responsive to normal changes in the attitude of the airplane as the result of flight operation, and the other of which is responsive to gust conditions.

It is a further object of this invention to provide a gust detector or measuring means which is not affected by acceleration or angle of attack forces due to change in velocity or attitude of the airplane.

It is a further object of this invention to provide a gust detector or measuring device which sends out a signal when the parts thereof depart from a normal position, the signal corresponding to the departure from such normal position.

It is a further object of this invention to provide a differential gust measuring device which includes signal means responsive to variations from a normal position and means for transmitting the signal to an amplifying unit and to an electric solenoid valve or other suitable mechanism which controls the gust flap actuating means.

It is a further object of this invention to provide a device for measuring the effect of gusts on airplanes and for causing the wing lift coefficient of the airplane to change in response to the measured gust effect so as to alleviate or nullify the effect thereof.

Other objects of invention will become apparent from the following description taken in conjunction with the drawings, in which:

Fig. 7 is a top plan view, partly in section, of a modified detector;

Fig. 8 is a side elevational view, partly in section, of the detector illustrated in Fig. 7;

Fig. 9 is a front elevational view of Fig. 7;

Fig. 10 is a diagrammatic arrangement with certain parts shown in detail of a system for effecting the invention;

Fig. 11 is a view taken along the line 11—11 of Fig. 10;

Fig. 12 is a view taken along the line 12—12 of Fig. 10;

Fig. 13 is a view taken along the line 13—13 of Fig. 10; and

Figs. 14 and 15 are views similar to Fig. 10 showing alternative arrangements.

Figure 1:
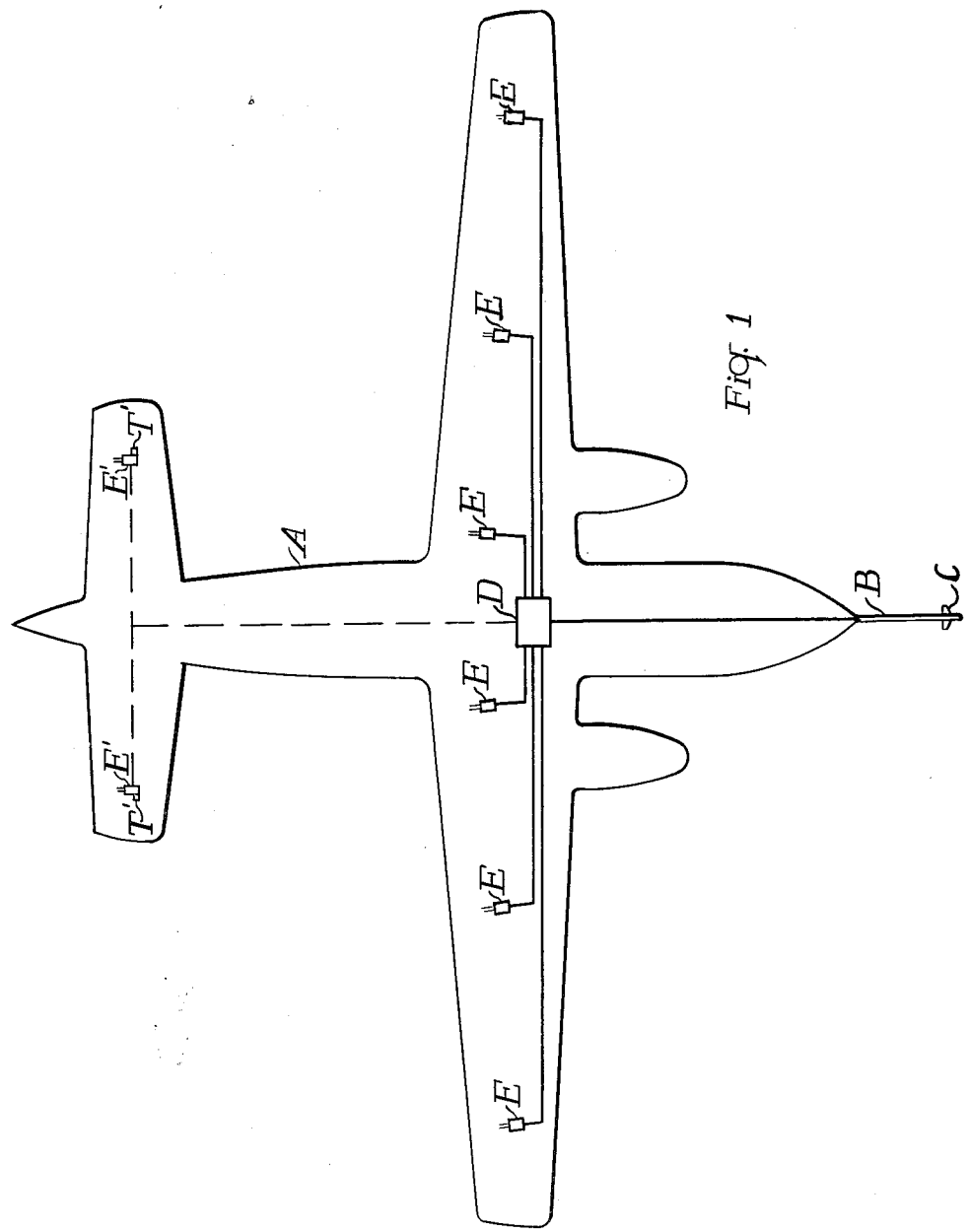
Fig. 1 is a top plan view of an airplane showing a schematic arrangement of the invention applied thereto.
Figure 2:
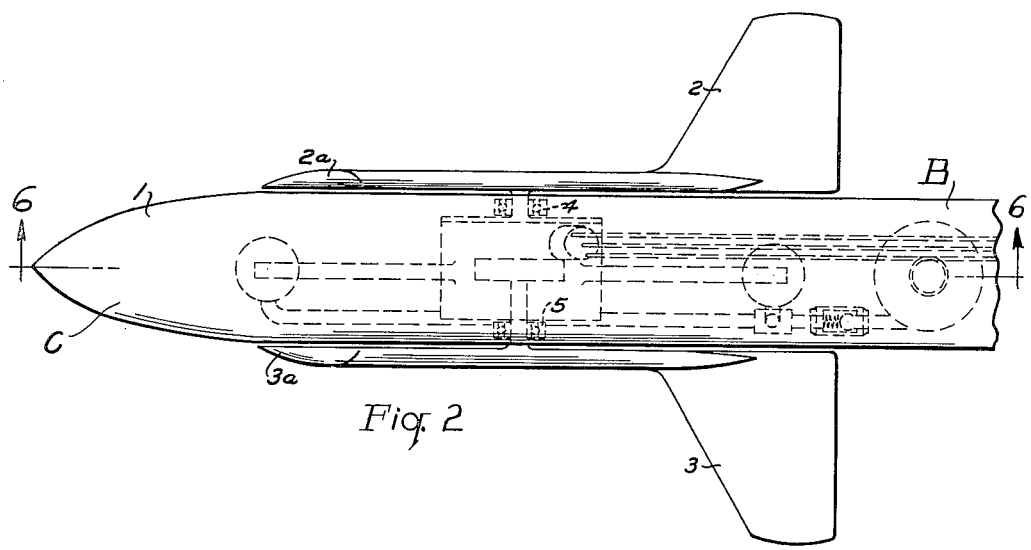
Fig. 2 is a top plan view of a gust detector.
Figure 3:
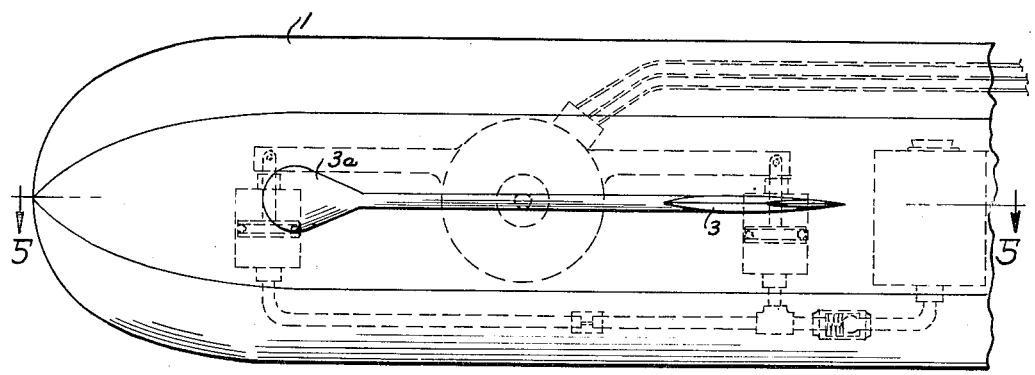
Fig. 3 is a side elevational view of the same.
Figure 4:
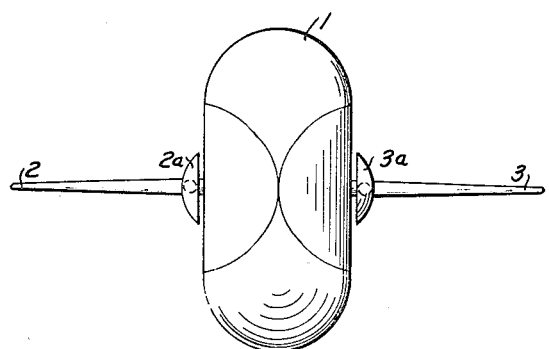
Fig. 4 is a front elevational view of the same.

Referring to the drawings, Fig. 1 shows an airplane A provided with a mast B for carrying a gust detector C which is operatively connected to a central control arrangement D which in turn is operatively connected to a plurality of actuating units E and, in an alternative arrangement may also be connected to control units E'.

Referring to Figs. 2–6 of the drawings, the gust detector C includes a body portion or casing 1 to which a pair of vanes 2 and 3 are pivotally mounted by suitable bearings 4 and 5. These vanes are suitably counterbalanced about their pivot points by elements 2a and 3a. The vane 2 is rigidly attached to the casing of a potentiometer unit 6, which is attached by arms 7 and 8 to a dashpot arrangement comprising cylinders 9, pistons 10, reservoir 11, and interconnecting line 12 having therein a restriction coupling 13, and a check valve 14. Movement of vane 2 is thus retarded by the damping arrangement so as to change its attitude to correspond with normal changes in attitude of the airplane occasioned by pilot control. Vane 3, which is undamped and accordingly free to move in response to gusts, has connected thereto a core 15 constituting a part of an electrical impulse transmitting unit such as a potentiometer which is responsive to variations in the flow of current in a circuit. These units are commercially available and are sold under various trade names. Extending from the potentiometer unit are wires connected to actuating mechanism for causing operation of the aircraft controls in response to variations in flow in the potentiometer unit to change the wing-lift coefficient or characteristics of the aircraft and thereby nullify the effect of any gusts encountered by the aircraft. Thus it is apparent that the difference in movement between the damped and undamped vanes results in variation in flow of current in the potentiometer unit which amounts to a signal impulse that is utilized for operating the control members of the aircraft to nullify the effect of gusts thereon.

It is apparent that the damped vane will ultimately move to the same position as the undamped vane if the latter is retained in a given position sufficiently long to permit the establishment of a parallel relationship. Initial impulses as a result of actuation of the undamped vane in response to encounter with gusts will gradually diminish as the vanes return to equilibrium or normal position. This provides a "tapering off" effect and serves as a follow-up to gradually diminish the amount of force applied to the mechanism used for changing the wing-lift coefficient or characteristics of the aircraft to compensate for the effect of the gusts encountered.

Figure 5:
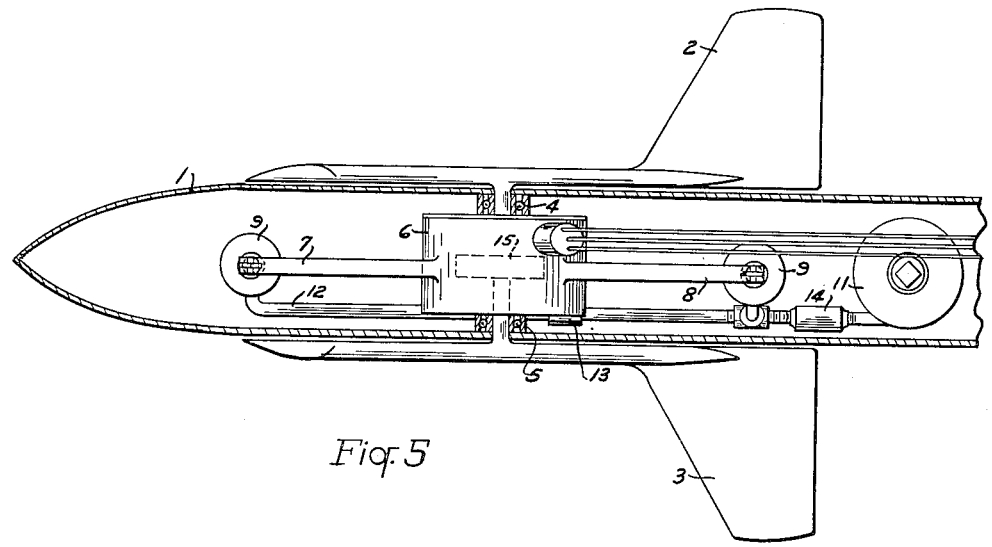
Fig. 5 is a sectional view taken generally along the line 5—5 of Fig. 3.
Figure 6:
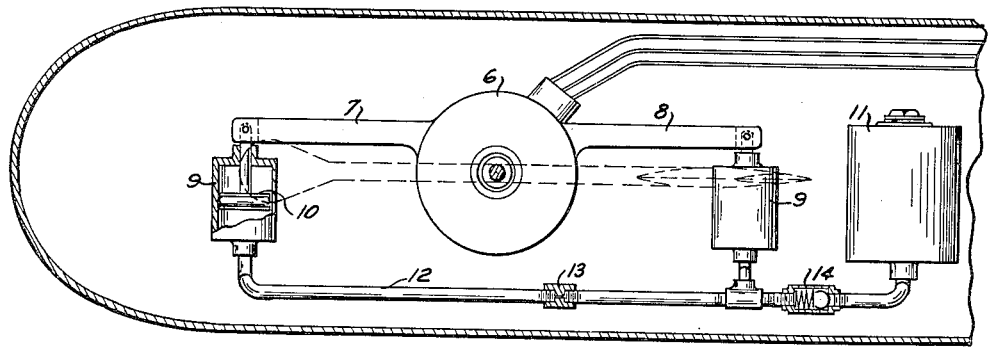
Fig. 6 is a sectional view taken generally along the line 6—6 of Fig. 2.

In the alternative arrangement illustrated in Figs. 7, 8, and 9 there is provided a single vane 2b pivotally attached to mast B by means of a shaft 20 suitably supported and retained in antifriction bearings 21. This fin, or vane, is provided with a dashpot arrangement comprising members 23 which are similar in function and detail to members 9 in Fig. 6. Arm 22, rigidly attached to shaft 20, operatively connects the piston arrangements included in the dashpot arrangement. In this arrangement the freely floating vane, such as vane 3 in Fig. 5, is eliminated and replaced by what amounts to a pitot tube arrangement comprising a sealed casing 24 provided interiorly of casing 1b and containing a pressure responsive bellows 25 operatively connected by a linkage 26, 27, and 28 to the core 29 of a potentiometer unit, the casing 30 of which is suitably attached to casing 24. Linkage 26 is pivotally supported at 36 on bracket 37 which in turn is suitably attached to casing 30. Bellows 25 is operatively connected by a tube 31 to an inlet 32 in the lower front part of the vane, while inlet 33 in the upper front part of the vane is connected by tube 34 to the interior of casing 24. While the vane 1b follows and is responsive to gradual changes in the attitude of the aircraft, openings 32 and 33 serve to measure any gust encountered by the vane, both in direction and amount. The potentiometer unit which operates in response to the difference in pressure between openings 32 and 33 is operatively connected by means of wires, shown generally, to actuating means for causing operation of the aircraft control in the same manner as the potentiometer unit described in connection with Figs. 5 and 6. This arrangement, by provision of a single damped vane, is especially adapted for high-speed aircraft and avoids any flutter problem which may be encountered in connection with a freely floating vane.

In the operation of the arrangement shown in Figs. 7, 8, and 9, as long as the pressure on openings 32 and 33 is equal, the flap and related control equipment will remain neutral. Upon encountering a gust, the sudden change in angle of attack results in an increase or decrease in the pressure at one orifice with respect to the other, causing movement of the bellows or other pressure sensitive means. This will in turn cause a change in position of the core of the potentiometer unit, which in turn will result in actuation of the flap mechanism for changing the wing-lift coefficient or characteristics of the aircraft.

Figure 15:
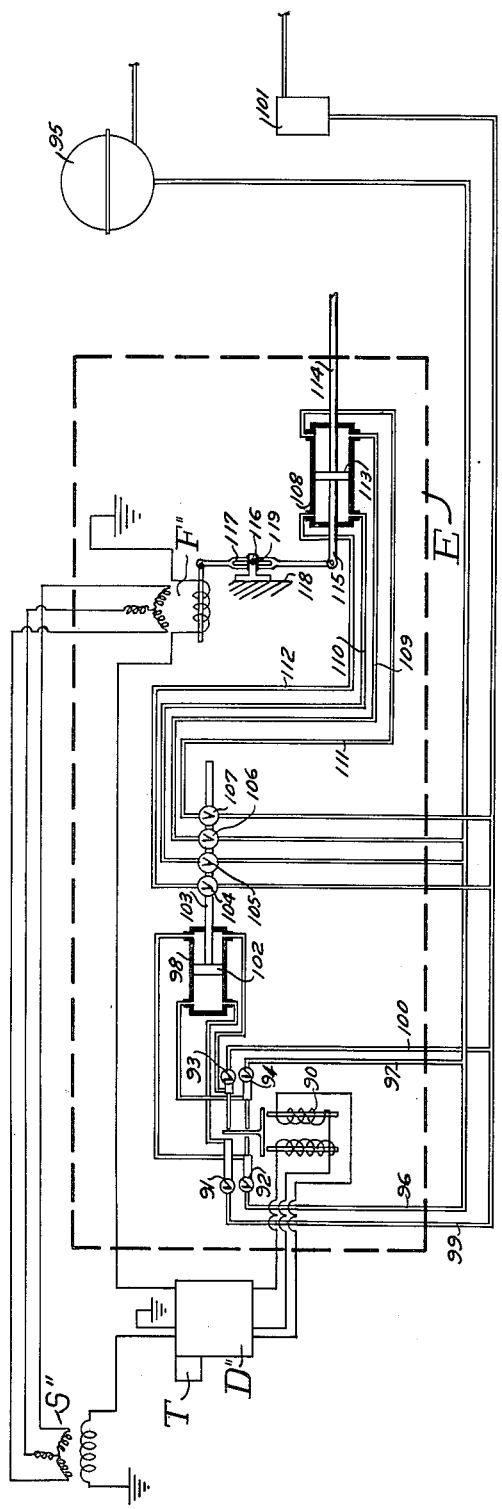

Mechanism for actuating the flap will now be described:

Referring to Fig. 10, electrical impulses or signals are transmitted from potentiometer unit S to control transmitter D containing, in a manner well known in the art, tubes and other electrical and electronic devices for amplifying or stepping up the amperage from the potentiometer circuit. Electrically connected to the control transmitter, to be operated thereby, are a pair of electric brakes 40 and 41 operatively associated with housing members 42 and 43 of a planetary gearing system. Such system is adapted to be driven by constant speed motor 44 having a fly wheel 45 associated therewith and a shaft 46 driven thereby. The electric brakes comprise a conventional arrangement such as a solenoid actuated by a coil for the purpose of engaging the members 42 and 43 for holding the same against rotation when desired. These arrangements are conventional, may be purchased on the open market, and are shown schematically in the drawings. The follow-ups indicated at F in Figs. 10, 14, and 15 are also considered well known to persons skilled in this field. See for example the reference in The Electronic Control Handbook by Ralph B. Batcher and William Moulic, copyrighted 1946 by Caldwell-Clemens, Inc. of New York, page 237, Fig. 6–IV of the section on Synchros and Servo Systems. See also Fig. 12–IV, page 241. Systems of this sort are available as commercial items from numerous sources. Typical are the General Electric Corporation (Selsyn) and the Pioneer Instrument Company (Autosyn). Fixed to shaft 46 is a gear 47 adapted to mesh with idler gear 48 which in turn meshes with gear 49 integral with shaft 50. Rigidly secured to shaft 50 is a gear 51 adapted to mesh with gear 52 freely rotatably mounted on shaft 46 and provided with an integral sleeve or hollow shaft 53 to which is attached a gear 54. Housing 42 is freely rotatable on hollow shaft 53 and is provided with teeth 55 adapted to mesh with gears 56, 57, and 58 which in turn mesh with gear 54. Rigidly attached to shaft 46 is a gear 54a adapted to mesh with gears 56a, 57a, and 58a which in turn mesh with teeth 55a on housing 43, freely rotatable on shaft 59, in an arrangement identical with the housing 42, teeth 55 thereon, and gears 54, 56, 57, and 58. Gears 56, 56a, 57, 57a, 58, and 58a are rotatably mounted on member 59a integral with shaft 59 which in turn is screw-threaded to flap actuating shaft 60. Operatively associated with shaft 60 is a follow-up unit referred to generally as F adapted to feed back to the potentiometer unit and the control unit when the shaft 60 has moved an amount called upon by those units. In the operation of the device in Fig. 10, potentiometer unit S transmits the gust signals which are picked up by the control transmitter D which in turn operates brakes 40 and 41. The transmitter also responds to operation of the follow-up system F to cause the gust flap to take the new position called for by the gust detector. The constant speed motor 44 is adapted to drive the planetary system at a constant rate and, as long as neither of the housings 42 or 43 are retarded in their movement, shaft 60 remains in a constant position. In response to impulses from the potentiometer unit, the transmitter D may cause retarding of one of the other of housings 42 or 43, resulting in a rotation of the shaft 59 moving shaft 60 to an extended or retracted position, depending upon which of the housings is retarded.

Referring to Fig. 14, electrical impulses or signals are transmitted from the potentiometer unit S' to the control transmitter D', connected electrically to a torque motor 70 which in turn is operatively connected by links 71 and 72 to hydraulic control valves 73, 74, 75, and 76. These valves constitute a variable flow valve system, constantly floating and subjected to vibrations to eliminate static friction. Fluid pressure is supplied through these valves from a hydraulic accumulator 77 to a piston arrangement 78 including a piston 79 attached to rod 80 for actuating the airplane control flap. Follow-up system F'' is operatively associated with a rod 81 also attached to piston 79. The follow-up system operates in this arrangement in an identical manner with the follow-up system F illustrated in Fig. 10. A hydraulic reservoir 82 is adapted to receive fluid from the piston arrangement 78 through suitable return lines 83 and 84. Fluid from the hydraulic accumulator 77 is supplied to the piston arrangement through pipes 85, 86, and 87.

Referring now to arrangement shown in Fig. 15 there is shown a potentiometer unit S'' electrically connected to control transmitter D'' which in turn is electrically connected to a solenoid arrangement 90 operatively associated with valve elements 92 and 94 for controlling flow of hydraulic fluid from hydraulic accumulator 95 through pipes 96 and 97 to a pilot valve 98. Return flow from the pilot valve is also controlled by the solenoid arrangement operating valves 91 and 93 to return hydraulic fluid through pipes 99 and 100 to hydraulic reservoir 101. Pilot valve 98 is provided with a piston 102 operatively connected by shaft 103 to variable flow hydraulic control valve arrangement 104, 105, 106, and 107 for regulating flow of fluid to and from a flap actuating hydraulic cylinder 108. Pipes 109 and 110 operatively connect the cylinder with the hydraulic accumulator 95 while pipes 111 and 112 provide return flow from the cylinder to the hydraulic reservoir 101. Cylinder 108 is provided with a piston 113 to which is attached a flap actuating rod 114. Also attached to the piston is a rod 115 which in turn is connected to a mechanical ratio changer arrangement 116 for varying the extent of flap movement per unit of gust vane indicator movement. Operatively associated with the ratio changer is a follow-up system F'' similar in construction and operation to the follow-up system F in Fig. 10. The mechanical ratio changer permits the pre-selected amount of flap operation per degree of gust vane indicator movement to be varied and also permits changing the ratio of flap operation to the movement of the gust vane indicator. The ratio changer will control travel of the piston rod in the follow-up system so as to vary the magnitude of flap deflection per degree of gust indication. The ratio changer 116 comprises mainly a bifurcated element 117 adapted to be adjustably positioned with respect to a supporting bracket element 118 providing a pivot point 119. By changing the ratio of movement in the follow-up system, the feed-back obtained when the flap is in the position called for by the indicator may be adjusted to provide a variable control for the flap operating mechanism.

In a modified form of the invention there is provided a variable time control arrangement T, shown schematically in Fig. 15. This arrangement is electrically connected into the circuit ahead of the control amplifier D'' and is for the purpose of controlling the time of response of the aircraft control elements. This arrangement may be desirable whenever it is necessary to compensate for the time lag occasioned by the location of the gust detector ahead of the wing section of the aircraft. The time control arrangement is adapted to delay the transmission of the control signal from the gust detector to the control amplifier and is adjustable to take care of changes in velocity of the airplane. In a commercial aircraft it would normally be set at the cruising speed of the aircraft. This unit serves to control the time of operation of the gust alleviating system in somewhat the same manner as the mechanical ratio changer controls the magnitude of gust correction for a gust of given intensity. Electrical time delay mechanisms of the type proposed to be used herein are commercially obtainable and are of the type described in U. S. Patent to Begun, No. 2,439,446.

In the foregoing arrangement there is shown a gust measuring device which is responsive to gusts but which also supplies its own plane of reference. In other words the attitude of the airplane may change depending upon its speed and air conditions, which may be regarded as constant, and the gust detector will adjust itself to such conditions, measuring only sudden variations from such conditions. In this connection it is recognized that an airplane must have a certain amount of maneuverability. Consequently, the amount of damping of gusts is dependent upon the desired maneuverability of the airplane. The system may be designed for a normal movement of $3\frac{1}{2}°$ per second of the damped vane and maintain the allowable normal acceleration to $\frac{1}{10}$ G. The damping effect resulting from the operation of the gust measuring and compensating mechanism must necessarily be a compromise between desired maneuverability and maximum acceleration to which the airplane is to be limited. In this connection a normal condition of $3\frac{1}{2}°$ per second of movement of the damped vane per $\frac{1}{10}$ G. acceleration may be regarded as a standard condition. A larger angular movement per second increases the allowable maneuverability, and also increases the acceleration to which the airplane can be subjected. A smaller degree of change per second decreases the allowable maneuverability, and also decreases the acceleration to which the airplane can be subjected in a gust.

Referring again to Fig. 1, it may be desired, in an alternative arrangement, to compensate for the change in lift of the empennage portion of the airplane. To accomplish this, control units E', similar in function and operation to control units E, are located in the empennage portion of the airplane, operatively connected to the elevators, and coordinated with the control units E. A separate time delay control T' may be provided for these control units to effect such coordination and compensate for the distance between the wing and empennage sections. A separate ratio changer may also be provided to take care of the difference in size of the empennage section to the wing section and the proportion of lift carried by the empennage section.

Although the invention has been described and illustrated in detail, it is to be clearly understood that the same is by way of illustration and example only and is not to be taken by way of limitation, the spirit and scope of this invention being limited only by the terms of the appended claims.

I claim:
1. In combination with an airplane, an arrangement for materially reducing vertical accelerations of said airplane as a result of turbulence in the air through which the airplane is moving comprising a highly sensitive feeler mounted forwardly of said airplane and provided with a direction- and magnitude-sensitive part which is responsive to the vertical component of airflow relative to the airplane caused by said turbulence, means on said airplane for changing the wing-lift coefficient thereof, means for maintaining a plane of reference conforming to gradual changes in the attitude of said airplane, and means operatively connecting said feeler with said means for maintaining said plane of reference and said wing-lift-coefficient-changing means for transmitting the response of said direction- and magnitude-sensitive part to said wing-lift-coefficient-changing means to operate the same by an amount which substantially neutralizes any effect of changes in vertical component of air force to change the airplane from its projected course as established by said plane of reference, before such changes in force become effective to shift the airplane vertically from such projected course.

2. An arrangement as recited in claim 1 in which said highly sensitive feeler comprises a vane freely pivotally mounted on said airplane.

3. An arrangement as recited in claim 1 in which said means for maintaining a plane of reference comprises a vane damped to move gradually in response to air force exerted thereon, and said feeler comprises a vane freely pivotally mounted with respect to said damped vane.

4. An arrangement as recited in claim 1 in which said means for maintaining a plane of reference comprises a damped vane, said feeler comprises an undamped vane, and said means for changing the wing-lift coefficient of said airplane includes a potentiometer unit responsive to the difference in movement of said vanes.

5. In combination with an airplane, an arrangement for materially reducing vertical accelerations of said airplane as a result of turbulence in the air through which the airplane is moving, comprising a body member predeterminately positioned with respect to said airplane, feeler means carried by said body member and freely responsive to the vertical component of airflow relative to the airplane caused by said turbulence, means carried by said body member and damped to respond slowly to forces thereon and changes in the attitude of said airplane, means on said airplane for changing the wing-lift coefficient thereof, and means interconnecting said feeler and said damping means for transmitting an impulse corresponding to the difference in movement therebetween to said wing-lift-coefficient-changing means to operate the same by an amount corresponding to said difference in movement to thereby substantially neutralize any effect of changes in vertical component of air force which would otherwise shift the airplane vertically from its projected course.

6. An arrangement as recited in claim 5 in which said means interconnecting said feeler and said damping means includes a potentiometer.

7. An arrangement as recited in claim 5 in which said damped means comprises a balanced vane member pivotally mounted on said body, and said feeler means includes a vane member freely pivotally mounted on said body member to be responsive to vertical gusts encountered thereby.

8. An arrangement as recited in claim 5 and further including a timing device for controlling the response of said wing-lift-coefficient-changing means to said impulse transmitting means.

9. An arrangement as recited in claim 5 in which said means for changing the wing-lift coefficient of said airplane includes a transmitter responsive to said transmitted impulse, a solenoid valve operated by said transmitter, hydraulic means controlled by said solenoid valve, flap means on the wings of said airplane and operatively connected to said hydraulic means, and an adjustably responsive follow-up flap-operating mechanism for said impulse-transmitting means.

10. In combination with an airplane, an arrangement for materially reducing vertical accelerations of said airplane as a result of turbulence in the air through which the airplane is moving, comprising a pair of pivotally mounted vane members, one of which is freely mounted and the other of which is damped to respond gradually to forces exerted thereon and changes in attitude of said airplane; means interconnecting said vane members for transmitting an impulse corresponding to the movement therebetween, said means including a potentiometer operatively associated with one of said vanes for measuring the magnitude of any vertical gust encountered by said airplane; and means for changing the wing-lift coefficient of said airplane, including a transmitter responsive to said potentiometer, a solenoid valve operated by said transmitter, a flap-actuating hydraulic system controlled by said solenoid valve, and an adjustably responsive follow-up operatively connecting said flap-actuating mechanism and said potentiometer.

CARROLL G. GORDON.

REFERENCES CITED

The following references are of record in the file of this patent:

UNITED STATES PATENTS

| Number | Name | Date |
|---|---|---|
| 1,763,590 | Klemperer | June 10, 1930 |
| 1,862,902 | McDonnell | June 14, 1932 |
| 1,885,578 | Boykow | Nov. 1, 1932 |
| 1,935,824 | Upson | Nov. 21, 1933 |
| 1,956,755 | Constantin | May 1, 1934 |
| 2,262,968 | Schmidt et al. | Nov. 18, 1941 |
| 2,343,288 | Fink | Mar. 7, 1944 |
| 2,398,421 | Frische et al. | Apr. 16, 1946 |
| 2,428,194 | Bockrath | Sept. 30, 1947 |

FOREIGN PATENTS

| Number | Country | Date |
|---|---|---|
| 402,225 | Great Britain | Nov. 30, 1933 |